US006879632B1

United States Patent
Yokoyama

(10) Patent No.: US 6,879,632 B1
(45) Date of Patent: Apr. 12, 2005

(54) APPARATUS FOR AND METHOD OF VARIABLE BIT RATE VIDEO CODING

(75) Inventor: Yutaka Yokoyama, Tokyo (JP)

(73) Assignee: NEC Corporation, Tokyo (JP)

(\*) Notice: Subject to any disclaimer, the term of this patent is extended or adjusted under 35 U.S.C. 154(b) by 0 days.

(21) Appl. No.: 09/467,812

(22) Filed: Dec. 20, 1999

(30) Foreign Application Priority Data

Dec. 24, 1998 (JP) .......................................... 10/368222

(51) Int. Cl.⁷ .......................... H04N 7/12; H04N 11/02
(52) U.S. Cl. ................................................ 375/240.13
(58) Field of Search ............................. 348/401.1, 348, 348/384, 400.1, 405.1, 415.1, 402.1, 404.1; 382/239, 236, 232, 238; 375/240.13

(56) References Cited

U.S. PATENT DOCUMENTS

| | | | |
|---|---|---|---|
| 5,038,209 A | * 8/1991 | Hang | 375/240.05 |
| 5,301,242 A | 4/1994 | Gonzales et al. | 382/56 |
| 5,461,421 A | 10/1995 | Moon | 348/402 |
| 5,631,644 A | 5/1997 | Katata et al. | 341/67 |
| 5,703,646 A | 12/1997 | Oda | 348/401 |
| 5,969,764 A | 10/1999 | Sun et al. | 348/404 |
| 6,055,330 A | * 4/2000 | Eleftheriadis et al. | 382/154 |
| 6,173,012 B1 | * 1/2001 | Katta et al. | 375/240.15 |
| 6,181,742 B1 | * 1/2001 | Rajagopalan et al. | 375/240 |

FOREIGN PATENT DOCUMENTS

| | | |
|---|---|---|
| JP | 6-141298 | 5/1994 |
| JP | H9-23423 | 1/1997 |
| JP | H10-023433 | 1/1998 |
| JP | H10-155152 | 6/1998 |
| JP | 10-164577 | 6/1998 |
| JP | H10-164588 | 6/1998 |
| JP | H10-215460 | 8/1998 |
| JP | H10-294936 | 11/1998 |

OTHER PUBLICATIONS

"An Algorithm of MPEF2 Real Time Variable Bit Rate Video Coding with Quantizer Step", by Inada, et al., Information System Journal 2 C–11–3, p. 3, General Conference of the Institute of Electronics, Information and Communication Engineers in Mar., 1998.

\* cited by examiner

Primary Examiner—Chris Kelley
Assistant Examiner—Behrooz Senfi
(74) Attorney, Agent, or Firm—Scully, Scott, Murphy & Presser

(57) ABSTRACT

The quantization step size is set on the basis of features of image and the average bit rate is adjusted for the variable bit rate coding. In more specifically, the quantization step size is set such as to hold a constant coded image quality level over a plurality of groups of pictures. The quantization step size is adjusted from the excess or shortage of the actual generated bit count with respect to the average bit rate with reference to the quantization step size that has been set as above.

20 Claims, 5 Drawing Sheets

APPARATUS FOR AND METHOD OF VARIABLE BIT RATE VIDEO CODING

BACKGROUND OF THE INVENTION

The present invention relates to an apparatus for and a method of variable bit rate video coding and, more particularly, to those in which the generated code bit count is controlled in real time at a variable bit rate.

MPEG-2 (ISO/IEC-13818-2), for instance, is well known in the art as a method of high efficiency video coding. In this method, the picture is divided into a plurality of blocks each constituted by a group of a plurality of pixels, and a special domain signal is converted to a frequency domain signal by executing discrete cosine transform (DCT) on each block. Each frequency component called DCT coefficient obtained by the discrete cosine transform, is quantized with a quantization step size, which is predetermined for each coefficient position (i.e., frequency). The quantized data is variable length coded by assigning variable length codes to the DCT coefficients. The coded data thus obtained is provided as a bit stream.

FIG. 8 is a view for describing an image coding method conforming to the MPEG-2 (ISO/IEC-13818-2). Referring to the Figure, the method is implemented by a system comprising a subtracter 501, a discrete cosine transform unit 502, a quantizer 503, a variable length coder 504, a bit rate controller 505, an inverse quantizer 506, an inverse discrete cosine transform unit 507, an adder 508, a frame memory 509, a motion compensated inter-frame predictor 510 and a selector 511.

Input picture images are classified into I pictures to be intra-frame coded, P pictures to be inter-frame prediction coded by using only forward prediction and B pictures, for which prediction in both forward and backward is made. The input image is divided into a plurality of macro-blocks each of 16×16 pixels for coding the image in units of macro-blocks.

I pictures are intra-frame coded without the inter-frame prediction. In this case, the selector 511 selects signal value of "0" as prediction value, and the same value is outputted as input image signal value from the subtracter 501. The discrete cosine transform unit 502 executes discrete cosine transform on the output signal value from the subtracter 501, and thus outputs a DCT coefficient. The quantizer 503 quantizes the DCT coefficient with a predetermined quantization step size.

The quantizer 503 outputs a quantized DCT coefficient as quantized coefficient to the variable length coder 504. The variable length coder 504 encodes the quantized coefficient with variable length codes. The variable length coded quantized coefficient is outputted together with other data as a bit stream. The inverse quantizer 506 inversely quantizes the quantized coefficient output of the quantizer 503. The inverse discrete cosine transform unit 507 executes inverse discrete cosine transform on the inversely quantized coefficient output of the inverse quantizer 503 thus reconstructing the original input image signal.

The reconstructed image signal that is obtained through the inverse quantizer 506 and the inverse discrete cosine transform unit 507, is used as reference image in subsequently executed inter-frame prediction, and is stored through the adder 508 in the frame memory 509. The motion compensation inter-frame predictor 510 executes inter-frame prediction on the P and B pictures. The predictor 510 first determines a motion vector by comparing the input image signal and the reference image stored in the frame memory 509 and executing motion estimation for each macro-block as a division of the input image. Then, the predictor 510 determines a prediction mode based on the result of the motion estimation for each macro-block. In this process, it is determined whether it is better to or not to set an intra-frame mode, in which a macro-block coding process is executed on P and B pictures.

When it is determined that it is better to set the intra-frame mode for coding process determined in a macro-block prediction mode, the macro-block coding process on P and B pictures is the same as the above coding process on I pictures, that is, intra-frame coding process is executed without motion compensated inter-frame prediction according to any determined motion vector.

When it is determined that it is better not to set the intra-frame mode, that is, it is better to set the non-intra-frame mode in the macro-block prediction mode, the macro-block coding process on P and B pictures is executed with infra-frame prediction by using the image signal recorded in the frame memory 509 as reference image. The motion compensated inter-frame predictor 510 generates a predicted image signal corresponding to input image signal on the basis of a previously determined motion vector.

The predicted image signal thus generated is provided to the subtracter 510 and also to the adder 508. In the following, the predicted image signal supplied to the subtracter will be described. Receiving the predicted image signal, the subtracter 501 computes the differential signal between the input image signal and the predicted image signal. The subsequent coding process on the differential signal is the same as the coding process on I pictures. That is, the discrete cosine transform unit 502 generates DCT coefficients from the differential signal, and the quantizer 503 quantizes the DCT coefficients.

The differential signal outputted from the quantizer 503 is provided to the variable length coder 504 for providing a bit stream, and it is also provided to the inverse quantizer 506. Through the inverse quantizer 506 and the inverse cosine transform unit 507, a reconstructing process is executed on the coded differential signal. This reconstructing process is the same as the reconstructing process on P and B pictures as described above. Specifically, the adder 502 adds the reconstructed differential signal and the predicted image signal previously provided thereto, and thus a reconstructed image signal is generated. The reconstructed image signal generated in the adder 508 is stored in the frame memory 509 to be used as reference image in a subsequent coding process by inter-frame prediction.

As shown above, in a method represented by MPEG-2 (ISO/IEC-1388-2), for instance, an efficient coding process can be executed on the input video signal since it is possible to reduce the redundancy in the spatial domain in DCT and also reduce the time domain redundancy in the inter-frame prediction. In this method, the bit rate controller 505 which is provided between the variable length coder 504 and the quantizer 503, obtains the generated bit count from the variable length coder 504, then determines the quantization step size such as to meet a bit rate restriction, and transmits the determined quantization step size data to the quantizer 503 for controlling the generated bit count.

Prior art examples of coding process employed in the above method typically represented by the MPEG2(ISOP/IEC-13818-2) will now be described.

As a first prior art example, a bit rate control method in a test model (i.e., Test Model 5, ISO/ICE JTC1/SC21/

WG11/NO400, April in 1993) of MPEG-2 is well known as a bit rate control method in a coding method, which involves the above quantizing process.

This method adopts a constant bit rate coding method, which seeks to set a generated bit count in intra-frame coding process and coding process by inter-frame prediction to constant bit count for each of certain time units. Specifically, in this method the bit count is controlled by adjusting the quantization step size set for each macro-blocks obtained by dividing the picture frame into 16×16 pixels.

In this first prior art example, since the constant bit rate control method is adopted, it is necessary to control the bit count per unit time to be constant. The generated bit count is reduced by increasing the quantization step size for scenes, which requires high bit rate code generation, and increased by reducing the quantization step size for scenes, which do not require so high bit rate code generation.

In this example, however, the quantization step size is set to control the bit count per unit time to be constant independently of input images. Therefore, in a scene requiring many bits, the image quality is degraded, because the generated bits are suppressed by a large quantization step size.

To replace the constant bit rate coding method of the above first prior art example, a variable bit rate coding method has been proposed. In an example of variable bit rate coding method, when an encoder records images on storage media which have a predetermined total recording bit count, the output bit rate is controlled according to the bit count required for each image, thus improving the average image quality while meeting the restriction imposed on the recording capacity of the storage media.

As a second prior art example of coding process, Japanese Patent Laid-Open No. 6-141298 discloses a process, which adopts the above reliable bit rate control method. In this second prior art example, a provisional coding process is first executed, in which DCT coefficient quantization is executed on the basis of a preliminarily set reference quantization step size for computing generated bit count, and then a regular coding process is executed for actual coding. This coding process is thus a "two-pass coding" system, in which the regular coding process is executed after completion of the provisional coding process. In other words, re-coding is executed after obtaining the knowledge of the characteristics of the whole contents, and it is thus possible to attain high image quality coding.

In this second prior art example, however, the coding of a certain video content requires execution of two processes, i.e., the provisional and regular coding processes, thus doubling the process time. Therefore, it is impossible to encode in real time processing.

For real time execution of the variable bit rate coding, a "single path coding" system, which does not execute any provisional coding process but executes the single regular coding process, has been considered.

As a third prior art example of coding process, "An Algorithm of MPEG2 Real time Variable Bit Rate Video Coding with Quantizer Step" (Inada et al, Information System Journal 2 D-11-3 (page 3), General Conference of the Institute of Electronics, Information and Communication Engineers in March, 1998), is well known as "single pass coding" system in the above variable bit rate coding system.

In this third prior art example, an image coding process conforming to MPEG-2 is executed, and after a predetermined period of time the generated bit count is adjusted by setting a quantization step size for each GOP to provide a predetermined average bit rate.

Japanese Patent Laid-Open No. 10-164577 discloses a fourth prior art example of coding process. In this fourth prior art example, the actual generated bit count is used to update the bit count which can be assigned to subsequent several GOPs, and a target bit count or a target quantization step size is determined for each GOP on the basis of the ratio of the coding complexity of the present image to the average coding complexity over past images.

However, the above signal pass variable bit rate coding systems have a problem that a series of coding processes may result in deterioration of the image quality. This is so because in the single pass coding systems a bit count capable of being assigned or a target bit rate is computed before computation of the target bit count or quantization step size. This means that preference is given to bit rate control in a fixed time period, resulting in insufficient quantization step size control depended on the image scene. Consequently, the coded image quality may not substantially differ in comparison to the constant bit rate case.

In addition, in the case of that the bit count is less than the average bit rate although the image does not require high bit rate code generation in low complexity scenes, the generated code bit count is sought to be increased by reducing the quantization step size in spite of the fact that sufficient image quality is obtained. This may result in an excessive code assignment and wasteful code consumption. Consequently, it may become impossible to assign sufficient bit count with an image which requires more bits in high complexity scenes.

SUMMARY OF THE INVENTION

The present invention has been made in view of the above problems, and it has an object of providing a single pass variable bit rate coding system, which permits real time processing while ensuring improved image quality compared to the image quality obtainable with the prior art single pass variable bit rate coding systems.

According to the present invention, there is provided an apparatus for variable bit rate video coding of video data on the basis of a predetermined average bit rate comprising: a video coding means for coding input video with a predetermined quantization step size and providing coded data and a generated code bit count; a quantization step size setting means for setting a reference quantization step size for each first image unit, corresponding to an average bit rate, from the predetermined average bit rate, the quantization step size provided to the video coding means and also the generated code bit count; and a quantization step size adjusting means for calculating the average bit rate from the generated code bit count and for adjusting the quantization step size provided from the quantization step size setting means for each second image unit from the generated code bit count provided from the video coding means and also from a bit balance of the generated code bit count with respect to the average bit rate.

The first image unit is a group of a plurality of picture frames.

The second image unit is a group of a plurality of macro-blocks as divisions of one picture frame.

The quantization step size setting means for setting the reference quantization step size for each first image unit computes the first image unit complexity defined by the product of the average quantization step size over the preceding coded image and generated bit count, and also computes the reference quantization step size for each first image unit from the ratio between the first image unit complexity and the average bit rate.

The quantization step size adjusting means for adjusting the quantization step size for each second image unit sets a minimum permissible quantization step size.

The quantization step size adjusting means for adjusting the quantization step size for each second image unit sets a maximum excess of the average bit rate, sets a virtual buffer sized to the maximum excess from which codes are withdrawn at the average bit rate and adjusts the quantization step size for each second image unit by using the buffer occupancy in the virtual buffer and a utilizable buffer size obtained by subtracting the buffer occupancy in the virtual buffer from the size thereof.

The quantization step size setting means for setting the reference quantization step size for each second image unit includes a means for computing a first quantization step size by adjusting the quantization step size for each second image unit from the generated bit count provided from the video coding means and the bit balance to the average bit rate; and it sets a maximum bit rate, computes a second quantization step size, which is set in the case of constant bit rate control on the basis of the maximum bit rate, from the quantization step size set in the quantization step size setting means and the generated bit count provided from the video coding means, and provides the greater one of the first and second quantization step sizes to the video coding means.

The quantization step size setting means for setting the reference quantization step size for each first image unit computes a first image unit complexity for each first image unit, the first image unit complexity being defined by the product of the summation of generated bit count and the average quantization step size for each first image unit, and determines the quantization step size of the first image unit from the first image unit complexity of the first image unit and the bit count per first image unit.

The quantization step size setting means for setting the reference quantization step size for each first image unit computes the first image unit complexity for each first image unit from the summation of the generated bit count and the average quantization step size for each first image unit, and determines the quantization step size of the first image unit from the average first image unit complexity for the first image unit over the preceding coded image, the average first image unit complexity of the immediately preceding first image unit or a plurality of first image unit including the immediately preceding first image unit and the bit rate per first image unit.

The quantization step size adjusting means for adjusting the quantization step size for each second image unit preliminarily sets a threshold for quantization step size, when the bit balance of the generated bit count with respect to the average bit rate is not excessive, the reference quantization step size set for each first image unit is compared with the threshold for quantization step size, for providing the quantization step size without any adjustment when the reference quantization step size is not exceeding the threshold quantization step size, and adjusting the quantization step size according to the bit balance to the average bit rate and selectively providing the greater one of the adjusted quantization step size and the threshold for quantization step size, and when the bit balance of the generated bit count with respect to the average bit rate is excessive, the quantization step size is adjusted according to the bit balance to the average bit rate, the adjusted quantization step size being provided as the quantization step size for each second image unit.

According to the present invention, there is provided a method of variable bit rate video coding of video data on the basis of a predetermined average bit rate comprising a video coding step of coding input video with a predetermined quantization step size and providing coded data and a generated code bit count; a quantization step size setting step of setting a reference quantization step size for each first image unit, corresponding to an average bit rate, from the predetermined average bit rate, the quantization step size provided to the video coding step and also the generated code bit count provided therefrom; and a quantization step size adjusting step of calculating the average bit rate from the generated bit count and of adjusting the quantization step size provided from the quantization step size setting step for each second image unit from the generated code bit count provided from the video coding step and also from a bit balance of the generated bit count with respect to the average bit rate.

The first image unit is a group of a plurality of picture frames.

The second image is a group of a plurality of macroblocks as divisions of one picture frame.

In the quantization step size setting step of setting the reference quantization step size for each first image unit, a first image unit complexity is computed, which is defined by the product of the average quantization step size and generated code bit rate over the preceding coded image, and also the reference quantization step size for each first image unit is computed from the ratio between the first image unit complexity and the average bit rate.

In the quantization step size adjusting step of adjusting the quantization step size for each second image unit, a minimum permissible quantization step size is set.

In the quantization step size adjusting step of adjusting the quantization step size for each second image unit, a maximum excess of the average bit rate is set, a virtual buffer sized to the maximum excess is set for withdrawing codes at the average code bit, and the quantization step size is adjusted for each second image unit by using the occupation content in the virtual buffer and a utilizable code bit count obtained by subtracting the occupation content in the virtual buffer from the size thereof.

The quantization step size setting step of setting the reference quantization step size for each second image unit includes a step of computing a first quantization step size by adjusting the quantization step size for each second image unit from the generated code bit count provided from the video coding step and the bit balance of the generated bit count with respect to the average bit rate; and in the computing step, a maximum bit rate is set, a second quantization step size is computed, which is set in the case of fixed bit rate control on the basis of the maximum bit rate, from the quantization step size set in the quantization step size setting step and the generated code bit count provided from the video coding step, and the greater one of the first and second quantization step sizes is provided to the video coding step.

In the quantization step size setting means for setting the reference quantization step size for each first image unit, a first image unit complexity is computed for each first image unit, the first image unit being defined by the product of the summation of generated code bit rate and the average quantization step size for each first image unit, and the quantization step size of the first image is determined from the first image unit complexity of the first image unit and the bit rate per first image unit.

In the quantization step size setting means for setting the reference quantization step size for each first image unit, the first image unit complexity is computed for each first image unit from the summation of the generated code bit count and the average quantization step size for each first image unit, and the quantization step size of the first image unit is determined from the average first image unit complexity for the first image unit over the preceding coded image, the average first image unit complexity of the immediately preceding first image unit or a plurality of first image unit including the immediately preceding first image unit and the bit rate per first image unit.

In the quantization step size adjusting means of adjusting the quantization step size for each second image unit, a threshold quantization step size is preliminarily set, when the bit balance of the generated bit count with respect to the average bit rate is not excessive, the reference quantization step size set for each first image unit is compared with the threshold quantization step size, for providing the quantization step size without any adjustment when the reference quantization step size is not exceeding the bit balance to the average bit rate, and adjusting the quantization step size according to the bit balance of the generated bit count with respect to average bit rate and selectively providing the greater one of the adjusted quantization step size and the threshold quantization step size, and when the bit balance of the generated bit count with respect to the average bit rate is excessive, the quantization step size is adjusted according to the bit balance to the average bit rate, the adjusted quantizing with being provided as the quantizing with for each second image unit.

According to another aspect of the present invention, there is provided a method of variable bit rate video coding of video data on the basis of a predetermined average bit rate wherein quantization step size is set such as to hold a constant coded image quality level over a plurality of groups of picture images and the quantization step size is adjusted from a bit balance of a generated bit count with respect to an average bit rate with reference to the quantization step size that has been set as above.

In the present invention, the process of the setting of the quantization step size by utilizing features of image and the process of adjusting the average bit rate are realized separately for the variable bit rate coding. More specifically, the quantization step size is set such as to hold a constant coded image quality level over a plurality of groups of pictures.

In the average bit rate adjusting process, the quantization step size is adjusted from the excess or shortage of the actual generated code bit rate with respect to the average bit rate with reference to the quantization step size that has been set as above. Consequently, it is possible to realize a variable bit rate coder with higher image quality than the prior art single path variable bit rate coder since the quantization step size determined dependent on the scene becomes constant and then the quantization step size is adjusted so as to make the coding rate to the average bit rate.

In addition, by providing a minimum quantization step size that can be set and also by controlling the adjustment of an excessive or insufficient code bit count according to the quantization step size determined in dependence on the scene and the excess or shortage of the code bit count with respect to the average bit rate, it is possible to suppress generation of excess codes and permit code consumption with images, which it is desired to spend more codes. Thus, it is possible to obtain more uniform image quality improvement.

Other objects and features will be clarified from the following description with reference to attached drawings.

PREFERRED EMBODIMENTS OF THE INVENTION

Preferred embodiments of the present invention will now be described with reference to the drawings.

Figure 1:
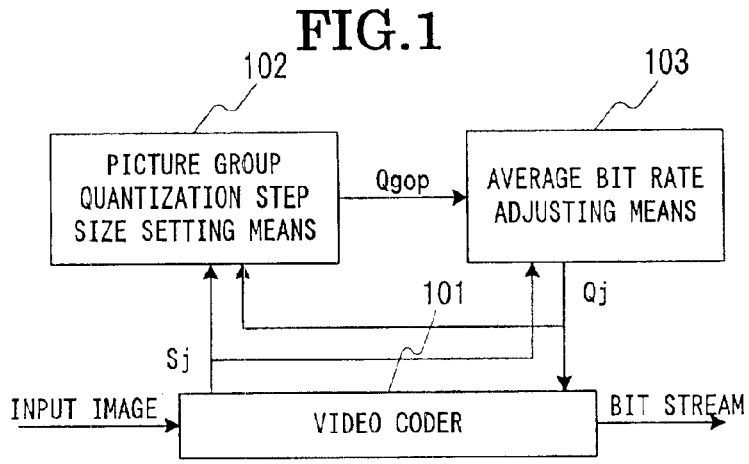
FIG. 1 is a view for describing a method of variable bit rate video coding according to the present invention.

FIG. 1 is a view for describing a method of variable bit rate video coding according to the present invention. It is assumed that an MPEG-2 (ISO/ICE-13818) system is used as coding system. This coding system, however, is by no means limitative, and it is possible to use any coding technique so long as a scalar quantizing process is adopted and the bit rate is controlled according to the quantization step size. For example, it is possible to use an MPEG-1 (ISOIEC-11172) system, or an ITU-T H. 261 or ITU-T H. 263 system.

The quantization step size provided to the video coding means is used as a reference for bit rate control, and it by no means interferes with adaptive quantization corresponding to a local position in the picture. This means that the finally provided adaptive quantization step size may be different from the quantization step size provided as reference by the bit rate control to the video coding means.

It is further assumed that GOP (i.e., group of pictures) is a first image coding unit, and the macro-block is the second image coding unit. However, these units in the coding process are by no means limitative, and it is possible to use any units, i.e., a unit of image quality control for a predetermined period of time and a smaller unit for finely adjusting values obtained by this control.

For example, the first image coding unit may be constituted by a plurality of GOPs, and the second image coding unit may be constituted by a plurality of macro-blocks. As further units in the coding process, an aggregation of macro-blocks in a row in the picture, a slice defined in MPEG-1 or MPEG-2 or GOB (i.e., Group Of Blocks) defined in H. 261 are conceivable.

The function of the embodiment of the variable bit rate video coder shown in FIG. 1 according to the present invention will now be described.

The variable bit rate video coder illustrated in FIG. 1 comprises a video coding means 101, a picture group quantization step size setting means 102 and an average bit rate adjusting means 103. The video coding means 101 executes a coding process according to quantization step size Qj given for each macro-block, and as a result of the process it outputs generated bit count Sj.

The quantization step size Qj provided to the video coding means 101 is also provided to the quantization step size setting means 102. The quantization step size setting means 102 sets reference quantization step size Qgop of GOP according to the quantization step size Qj thus provided and also the generated bit count Sj generated in the coding process, which is executed in the video coding means 101 according to the quantization step size Qj.

The actually generated bit count Sj provided to the quantization step size setting means 102 is also provided to the average bit rate adjusting means 103. The average bit rate adjusting means 103 compares and obtains the difference between the actually generated bit count Sj and a average bit rate, and adjusts the reference quantization step size Qgop of GOP provided from the quantization step size setting means 102, thus determining quantization step size Qj provided to the video coding means 101.

Figure 2:
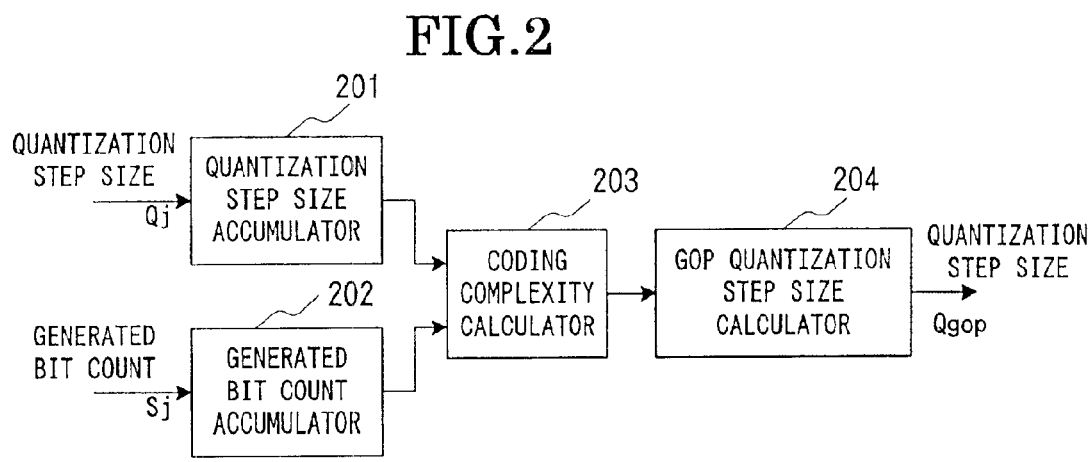
FIG. 2 is a view for describing the quantization step size setting means 102 shown in FIG. 1.

FIG. 2 is a view for describing the quantization step size setting means 102 shown in FIG. 1. Referring to the Figure, the quantization step size setting means 102 includes a quantization step size accumulator 201, a generated bit count accumulator 202, a coding complexity calculator 203 and a GOP quantization step size calculator 204.

The quantization step size accumulator 201 accumulates the quantization step size Qj, which is provided from the average bit rate adjusting means 103 to the quantization step size setting means 102. The accumulator 201 continues the operation of accumulating the quantization step size Qj over the entire coding process sequence. The generated bit count accumulator 202 accumulates the generated bit count Sj, which is provided from the video coding means 101 to the quantization step size setting means 102. The accumulator 202 also continues the operation of accumulating the generated bit count over the entire sequence.

The coding complexity calculator 203 calculates the complexity of each GOP from the average quantization step size Qj obtained from the summation of quantization step size obtained in the quantization step size accumulator 201 and the summation of generated bit count Sj obtained in the generated bit count accumulator 202. The average quantization step size Qj is obtained from the summation of quantization step size Qj provided from the quantization step size accumulator 201 and the number of times of output of the quantization step size Qj from the average bit rate adjusting means 103. The summation of generated bit count Sj is obtained as a result of accumulation of generated bit count Sj, which has been generated in the video coding means 101 according to the quantization step size Qj provided for each macro-block from the average bit rate adjusting means 103.

The GOP quantization step size calculator 204 computes reference quantization step size Qgop of each GOP from the GOP complexity of each GOP provided from the GOP complexity calculator 203 and the average bit rate.

Figure 3:
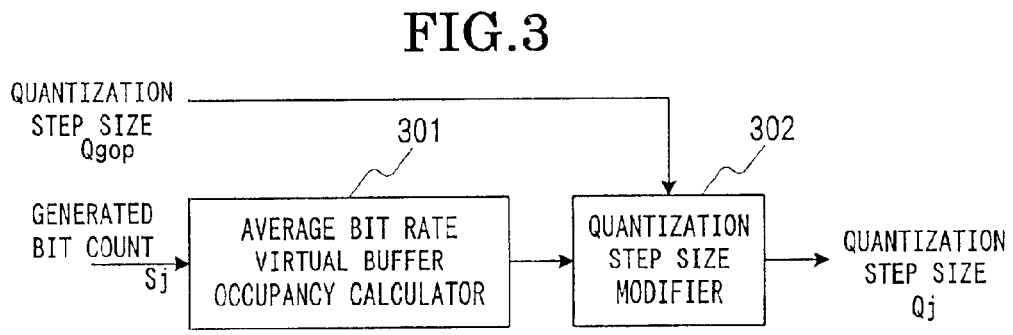
FIG. 3 is a view for describing the average bit rate adjusting means 103 shown in FIG. 1.

FIG. 3 is a view for describing the average bit rate adjusting means 103 shown in FIG. 1. Referring to the Figure, the average bit rate adjusting means 103 includes an average bit rate virtual buffer occupancy calculator 301 and a quantization step size modifier 302. The virtual buffer occupancy calculator 301 calculates a virtual buffer occupancy from the generated bit count Sj provided for each GOP from the video coding means 101 and the average bit rate.

The quantization step size modifier 302 modifies the quantization step size Qgop provided from the quantization step size setting means 102 according to the average bit rate virtual buffer occupancy calculated in the virtual buffer occupancy calculator 301, and sends out the modified quantization step size Qgop to the video coding means 101 and the quantization step size setting means 102.

Figure 4:
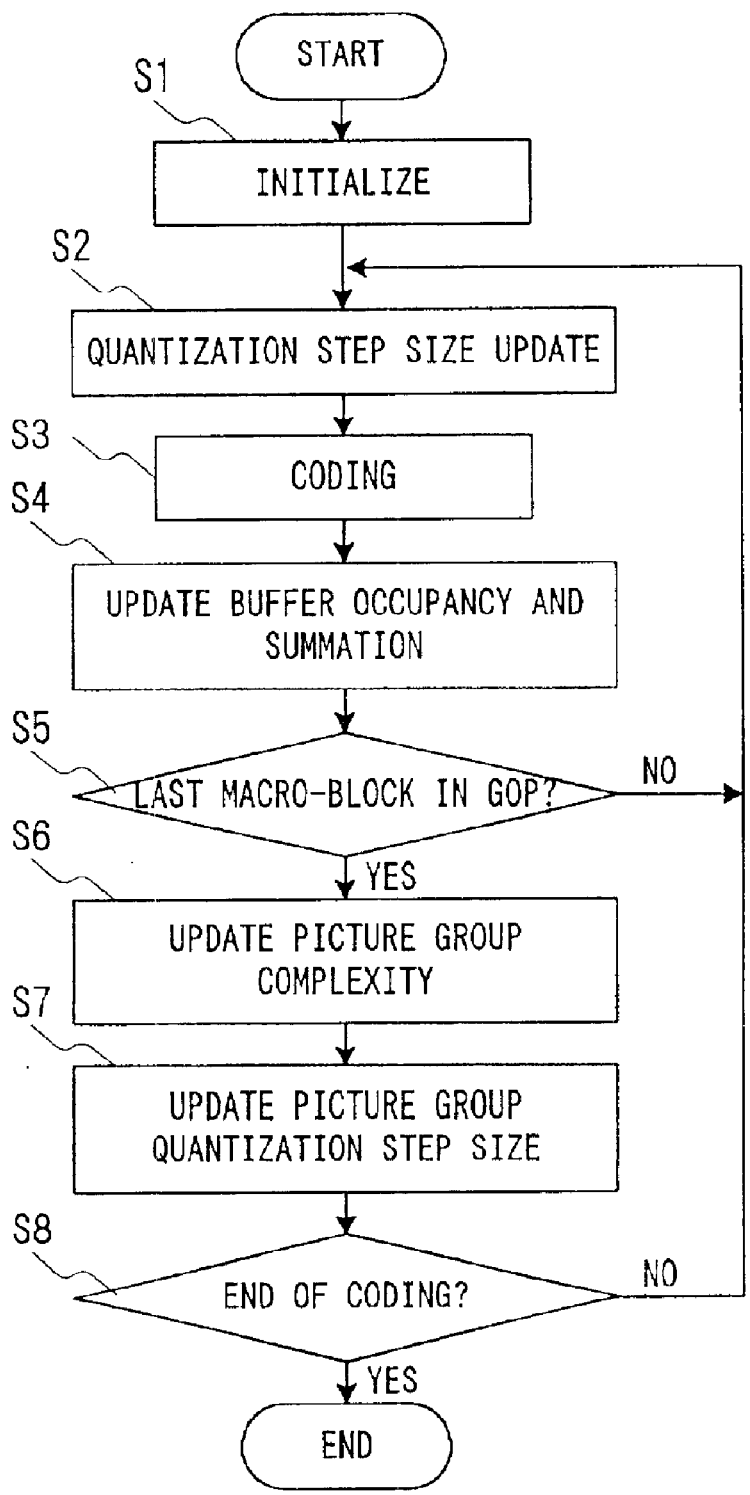
FIG. 4 is a flow chart illustrating an example of operation according to the present invention.

FIG. 4 is a flow chart illustrating an example of operation according to the present invention. The variable bit rate video coder is first initialized (step S1). In this step, the quantization step size setting means 102 is first initializes initial reference quantization step size Qgop. Specifically, an initial quantization step size Qinit is preliminarily set. According to the initial quantization step size Qinit the setting means 102 initializes Qgop by providing the initial reference quantization step size as Qgop=Qinit.

Then, the accumulators, various counters and virtual buffer occupancy are reset. Specifically, in the quantization step size setting means 102, summation Ssum of the generated bit count Sj generated in the generated bit count accumulator 201 and summation Qsum of the quantization step size Qj in the quantization step size accumulator 202 are reset to "0". Also, a macro-block number counter j and a GOP number counter Ngop are reset to "0". Furthermore, virtual buffer occupancy vboc is reset to "0". Mathematically, Ssum=0

Qsum=0 j=0

Ngop=0 and vboc=0.

In subsequent step S2, the quantization step size adjusting means 103 updates the reference quantization step size Qgop provided from the quantization step size setting means 102. Specifically, the adjusting means 103 executes adjustment of the reference quantization step size Qgop provided from the quantization step size setting means 102 according to the generated bit count Si generated in the coding process executed in the video coding means 101 and the buffer occupancy vboc obtained based on the average bit rate.

The quantization step size adjusting means 103 sets the adjusted quantization step size Qj as $$Qj = Qgop * (1 + vboc/Qreact)$$

where Qreact is a parameter for determining the magnitude of reaction to control of the generated bit count Sj for making up for an excess or a shortage, according to the reference quantization step size Ggop set in the quantization step size setting means 102 before update and the virtual buffer occupancy vboc before update.

In subsequent step S3, the video coding means 101 executes a coding process on the next macro-block according to the quantization step size Qj provided from the quantization step size adjusting means 103. After the coding process which is executed on one macro-block, for instance, the quantization step size setting means 102 executes step S4 of updating the virtual buffer occupancy vboc and the summation Ssum of the generated bit count set therein. To update the virtual buffer occupancy vboc, the setting means 102 adds the generated bit count Sj generated in the coding process on a j-th macro-block to vboc and subtracts the average bit rate Rave_mb from the sum.

In addition to the updating of the summation Ssum of the generated bit count set in the generated bit count accumulator 202, the coding means 102 also updates the summation Qsum of the bit count set in the quantization step size accumulator 201, and further increments a macro-block number counter j. Mathematically, $vboc=vboc+Sj-Rave\_mb$ $Ssum=Ssum+Sj$ $Qsum=Qsum+Qj$ and $j=j+1$ As is seen from the above calculations, the virtual buffer occupancy represents a bit balance of the actually generated bit count to the average bit rate Rave_mb.

In subsequent step S5, a judgment is made as to whether the macro-block to be coded is the last macro-block in GOP. When it is detected as a result of this judgment that the macro-block to be coded is other than the last macro-block of GOP (NO in step S5), the routine goes back to the step S2 to execute the coding process repeatedly on the next macro-block.

When it is detected in the judgment step S5 that the macro-block to be coded is the last macro-block of GOP (YES in step S5), a GOP complexity updating process is executed. Specifically, at this time a coding process on the next GOP is executed. At this time, the GOP number counter Ngop is incremented. Also, the GOP complexity calculator 203 in the quantization step size setting means 102 calculates new GOP complexity Xgop for updating from the summation Ssum of the generated bit count and the summation Qsum of the generated bit count in the entire sequence of the coding process on the preceding GOP (step S6). Mathematically, $Qgop=Ngop+1$ and $Xgop=Ssum*(Qsum/j)/Ngop$ Furthermore, the GOP quantization step size calculator 204 updates the reference quantization step size Qgop of the preceding GOP (step S7). Specifically, the calculator 204 calculates new reference quantization step size Qgop for updating from the ratio of the GOP complexity obtained as the above equation to the average bit rate Rgop per GOP. Mathematically, $Qgop=Xgop/Rgop$ In subsequent step S8, a judgment is executed as to whether the coding process on the last macro-block of GOP has been ended. When it is detected in the judgment that the coding process on the last macro-block has been ended (YES in step S8), an end is brought to the coding process on this GOP. When it is detected in the judgment step S8 that the macro-block having just been coded is other than the last macro-block of GOP, i.e., that the coding process on this GOP has not yet been ended (NO in step S8), the routine goes back to the coding process step S2 for executing the coding process on the succeeding macro-block.

A different embodiment of the present invention will now be described with reference to FIGS. 5 to 7.

Figure 5:
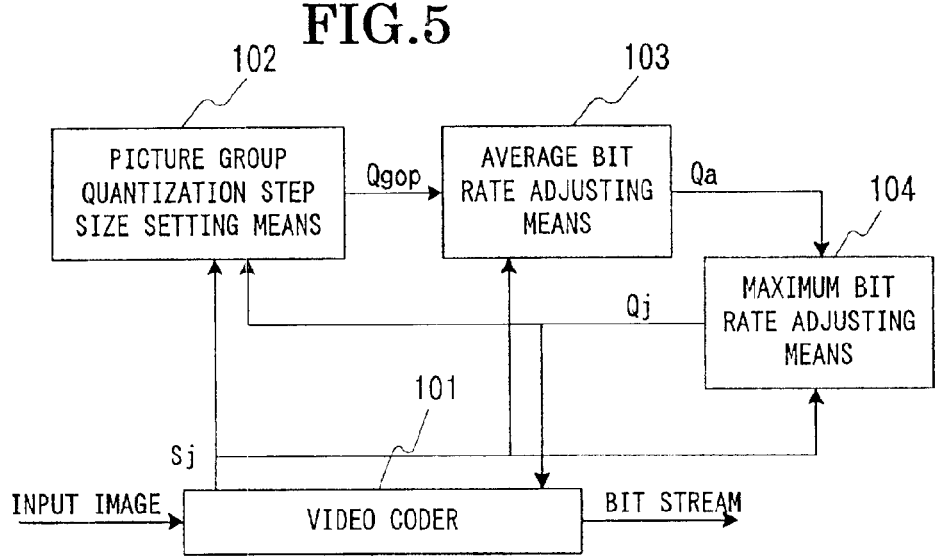
FIG. 5 is a block diagram showing the other embodiment of the present invention.

FIG. 5 is a block diagram showing the other embodiment of the present invention. This embodiment is obtained by adding a maximum bit rate adjusting means 104 to the previous embodiment shown in FIG. 1. The maximum bit rate adjusting means 104 controls the quantization step size according to the quantization step size Qa outputted from the average bit rate adjusting means 103 and generates the bit count Sj outputted from the video coding means 101 such as to observe the restriction on the maximum bit rate set therein, and output quantization step size Qj in second image units.

Figure 6:
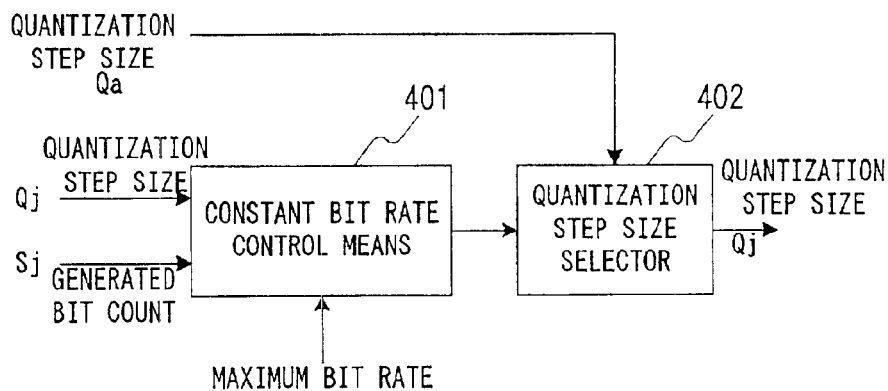
FIG. 6 is a block diagram showing the construction of the maximum bit rate adjusting means 104 shown in FIG. 5.
Figure 7:
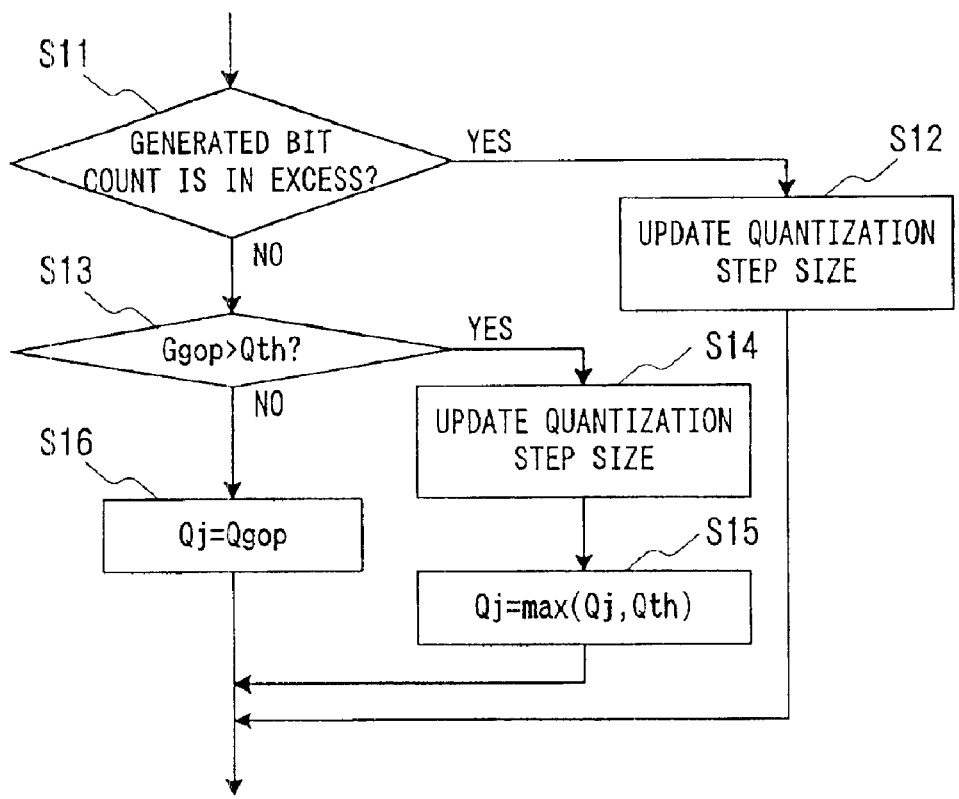
FIG. 7 is a flow chart illustrating the quantization step size updating process in the embodiment.
Figure 8:
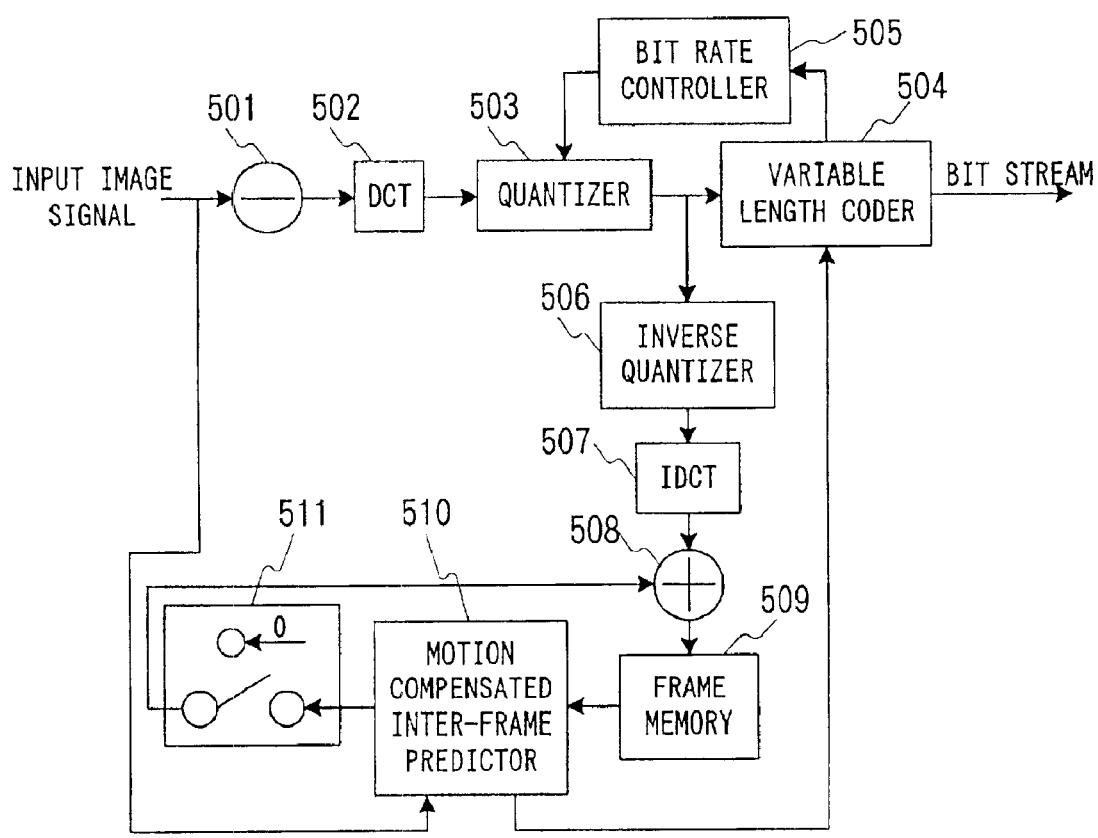
FIG. 8 is a block diagram of a prior art image coding method conforming to the MPEG-2 (ISO/IEC-13818-2).

FIG. 6 is a block diagram showing the construction of the maximum bit rate adjusting means 104 shown in FIG. 5. Referring to the Figure, the maximum bit rate adjusting means 104 includes a constant bit rate control means 401 and a quantization step size selector 402.

The constant bit rate control means 401 calculates the quantization step size in macro-block units by executing constant bit rate coding at a predetermined maximum bit rate. The quantization step size selector 402 compares the quantization step size calculated in the constant bit rate control means 401 and the quantization step size Qa set in the average bit rate adjusting means 103 by average bit rate control up to the immediately preceding coded macro-block, and selects the larger one as quantization step size Qj to be provided to the video coding means 101.

The constant bit rate control method may adopt, for instance, a "Test Model 5" method.

As a modification of the embodiment, a means for controlling the quantization step size outputted from the average bit rate adjusting means may be used, in which a minimum quantization step size Qmin is preliminarily set. In this case, the larger one of the preliminarily set minimum quantization step size Qmin and the quantization step size Qa outputted from the average bit rate adjusting means 103 may be provided as quantization step size Qj given as $Qj=\max(Qa, Qmin)$ to the video coding means 101 and the quantization step size setting means 102.

As a different modification of the embodiment, a means for controlling the quantization step size outputted from the average bit rate adjusting means may be used, which sets a maximum excess bit count Dmax from the average bit rate and controls the quantization step size by using the bit count Dmax and the virtual buffer occupancy vboc. For example, as for parameter Qreact used for the adjustment of the quantization step size according to the virtual buffer occupancy vboc, utilizable bit count (Dmax-vboc) may be calculated by subtracting vboc from the maximum excess bit count Dmax, and the smaller one of Qreact and (Dmax-vboc) may be used as the parameter Qreact, i.e., $Qreact=\min(Qreact, Dmax-vboc)$.

Alternatively, it is possible to use $Qj=Qgop*(1+vboc---/--(Dmax-vboc)$ or $Qj=Qgop*/(Dmax-vboc)$ instead of the parameter Qreact.

As a further modification of the embodiment, in the coding process on each GOP, the GOP complexity X of each GOP may be computed from the average quantization step size obtained from the summation Ssum.gop of the bit count Sj generated in the video coding means 101 and the summation Qsum.gop of the quantization step size Qj outputted per GOP from the average bit rate adjusting means 103 and the product of these parameters, and average GOP complexity Xgop may be obtained over these sequences, i.e., the coding processes on individual GOPs.

Specifically, when a coding process on an i-th GOP is ended the summation Ssum.gop of the bit count and the summation Qsum.gop of the quantization step size are obtained for the i-th GOP, and the GOP complexity X(i) of the i-th GOP is obtained from the product of these parameters. The summation of the quantization step size is set in macro-block units, and Nmb.gop is the number of macro-blocks per GOP.

In this case, assuming the first GOP serial number is "1", Xgop is calculated as $$X(i) = Ssum.gop * (Qsum.gop/Nmb.gop)$$

$$\text{and } Xgop = (X(i) + X(i-1) + \ldots + X(1))/i$$

The average GOP complexity Xgop may not be over the GOPs of GOP serial numbers 1 to i, but it may be over any previously coded GOPs, that is, in a further modification of the embodiment it may be $$Xgop = (X(i) + X(i-1) + \ldots + X(i-N))/(N+1)$$

where N is a parameter for setting the number of GOPs for the average computation.

As a further modification of the embodiment, the reference quantization step size Qgop may be set from the relation between the average GOP complexity Xave, which is computed over the entire sequence of calculation of the GOP complexity X of each GOP, i.e., over the GOPs of GOP serial numbers 1 to i, and the average GOP complexity Xgop, which is calculated over GOPs from the immediately preceding coded GOP to the GOP of serial number i.

For example, mathematically $$Xave = (X(i) + X(i-1) + \ldots + X(1))/i$$

$$Xgop = (X)i) + X(i-1) + \ldots + X(i-N))/(N+1)$$

$$\text{and } Qgop = (Xave/Rgop) * (1 + \alpha * (Xgop - Xave))$$

where a is a parameter for determining the strength of control when setting Ggop according to the difference of X obtained from (Xgop−Xave). The parameter a may be set as $$\alpha = \alpha'/\delta x$$

where $\delta x$ is a standard deviation of complexity.

As a further modification of the embodiment, a threshold Qth as an upper limit quantization step size, may be provided for average bit rate adjustment when the reference quantization step size Qgop is adjusted in the average bit rate adjusting means 103. For example, the step S2 of the quantization step size updating process as described before in connection with the flow chart of FIG. 2, may be executed as shown in the flow chart of FIG. 7.

First, the average bit rate adjusting means 103 checks whether the bit count Sj generated in the coding process on each macro-block is in excess of the average bit rate assigned per macro-block (step S11). When detecting in the check that the bit count Sj is in excess of the average bit rate (YES in step S1), the average bit rate adjusting means 103 updates the reference quantization step size Qgop inputted from the quantization step size setting means 102 (step S12). The updated quantization step size Qj is outputted to the video coding means 101 and also to the quantization step size setting means 102.

When detecting in the check step S11 that the bit count Sj is not in excess of the average bit rate (NO in step S11), the average bit rate adjusting means 103 checks whether the reference quantization step size Qgop inputted from the quantization step size setting means 102 is exceeding a threshold Qth, i.e., upper limit, of the quantization step size (step S13). When detecting in this check that the reference quantization step size Qgop inputted from the quantization step size setting means 102 is above the threshold quantization step size Qth (YES in step S13), like the step S12 noted above, the average bit rate adjusting means 103 updates the reference quantization step size Qgop inputted from the GOP quantizing with setting means 102 (step S14). The updated quantization step size Qj is compared with the threshold Qth, and the greater one is selected (step S15).

Detecting in the check step S13 that the reference quantization step size Qgop inputted from the quantization step size setting means 102 is below the threshold quantization step size Qth (NO in step S13), the average bit rate adjusting means 103 does not update the reference quantization step size Qgop inputted from the quantization step size setting means 102. In this case, the reference quantization step size Qgop is outputted as Qj to the video coding means 101.

As has been shown, the average bit rate adjusting means 103 does not always execute adjustment of the reference quantization step size inputted from the quantization step size setting means 102, but it executes the adjustment process in dependence on whether the bit count of codes generated in the coding process on each macro-block is excessive or insufficient relative to the average bit rate assigned per macro-block and also the magnitude relation between the reference quantization step size and the threshold or upper limit quantization step size.

Thus, when the reference quantization step size inputted from the quantization step size setting means 102 is below the upper limit quantization step size and the bit count generated in the coding process per macro-block is below the average bit rate assigned per macro-block, it is possible to suppress the bit count of wasteful codes generated for making up for an excess of codes generated at the average bit rate.

Thus, when an image requires many bit rate, it is possible to spend the suppressed bits, thus improving the average image quality.

As has been described in the foregoing, according to the present invention it is possible to execute real time processing for variable bit rate coding and also higher image quality coding than obtainable with the prior art single-path variable bit rate coder, which executes the real time processing for variable bit rate coding.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An apparatus for variable bit rate video coding of video data on the basis of a target average bit rate comprising:

a video coding means for coding input video with a predetermined quantization step size and providing coded data and a generated code bit count;

a quantization step size setting means for calculating average complexity of whole coded data from the quantization step size provided to the video coding means and also the generated code bit count provided from the video coding means and for setting a reference quantization step size for each first image unit corresponding to the target average bit rate from the average complexity; and a quantization step size adjusting means for calculating a bit balance of the generated bit count with respect to the target average bit rate with a virtual buffer that is independent of picture types and for adjusting the reference quantization step size provided from the quantization step size setting means for each second image unit from the bit balance.

2. The apparatus for variable bit rate video coding according to claim 1, wherein:
the first image unit is a group of a plurality of picture frames.

3. The apparatus for variable bit rate video coding according to claim 1, wherein:
the second image unit is a group of a plurality of macro-blocks as divisions of one picture frame.

4. The apparatus for variable bit rate video coding according to claim 1, wherein:
the quantization step size setting means for setting the reference quantization step size for each first image unit computes an image unit complexity defined by the product of the average quantization step size over the preceding coded image and generated bit count, and also computes the reference quantization step size for each first image unit from the ratio between the first image unit complexity and the average bit rate.

5. The apparatus for variable bit rate video coding according to claim 1, wherein:
the quantization step size adjusting means for adjusting the quantization step size for each second image unit sets a minimum permissible quantization step size.

6. The apparatus for variable bit rate video coding according to claim 1, wherein:
the quantization step size adjusting means for adjusting the quantization step size for each second image unit sets a maximum excess of the average bit rate, sets a virtual buffer sized to the maximum excess from which codes are withdrawn at the average bit rate and adjusts the quantization step size for each second image unit by using the buffer occupancy in the virtual buffer and a utilizable buffer size obtained by subtracting the buffer occupancy in the virtual buffer from the size thereof.

7. The apparatus for variable bit rate video coding according to claim 1, wherein:
the quantization step size adjusting means for adjusting the quantization step size for each second image unit includes a means for computing a first quantization step size by adjusting the quantization step size for each second image unit from the generated bit count provided from the video coding means and the bit balance to the average bit rate; and
it sets a maximum bit rate, computes a second quantization step size, which is set in the case of constant bit rate control on the basis of the maximum bit rate, from the quantization step size set in the quantization step size setting means and the generated bit count provided from the video coding means, and provides the greater one of the first and second quantization step sizes to the video coding means.

8. The apparatus for variable bit rate video coding according to claim 1, wherein:
the quantization step size setting means for setting the reference quantization step size for each first image unit computes a first image unit complexity for each first image unit, the first image unit complexity being defined by the product of the summation of generated bit count and the average quantization step size for each first image unit, and determines the quantization step size of the first image unit from the first image unit complexity of the first image unit and the bit count per first image unit.

9. The apparatus for variable bit rate video coding according to claim 1, wherein:
the quantization step size setting means for setting the reference quantization step size for each first image unit computes the first image unit complexity for each first image unit from the summation of the generated bit count and the average quantization step size for each first image unit, and determines the quantization step size of the first image unit from the average first image unit complexity for the first image unit over the preceding coded image, the first image unit complexity of the immediately preceding first image unit or an average of a plurality of the first image unit complexity including the immediately preceding first image unit and the bit rate per first image unit.

10. The apparatus for variable bit rate video coding according to claim 1, wherein:
the quantization step size adjusting means for adjusting the quantization step size for each second image unit preliminarily sets a threshold for quantization step size,
when the bit balance of the generated bit count with respect to the average bit rate is not excessive, the reference quantization step size set for each first image unit is compared with the threshold for quantization step size, for
providing the quantization step size without any adjustment when the reference quantization step size is not exceeding the threshold quantization step size, and
adjusting the quantization step size according to the bit balance to the average bit rate and selectively providing the greater one of the adjusted quantization step size and the threshold for quantization step size, and
when the bit balance of the generated bit count with respect to the average bit rate is excessive, the quantization step size is adjusted according to the bit balance to the average bit rate, the adjusted quantization step size being provided as the quantization step size for each second image unit.

11. A method of variable bit rate video coding of video data on the basis of a target average bit rate comprising:
a video coding step of coding input video with a predetermined quantization step size and providing coded data and a generated code bit count;
a quantization step size setting step of calculating average complexity of whole coded data from the quantization step size provided to the video coding step and also the generated bit count provided from the video coding step and of setting a reference quantization step size for each first image unit corresponding to the target average bit rate from the average complexity; and
a quantization step size adjusting step of calculating a bit balance of generated bit count with respect to the target average bit rate with a virtual buffer that is independent of picture types and of adjusting the reference quantization step size provided from the quantization step size setting step for each second image unit from the bit balance.

12. The method of variable bit rate coding video data according to claim 11, wherein:
the first image unit is a group of a plurality of picture frames.

13. The method of variable bit rate coding video data according to claim 11, wherein:
the second image is a group of a plurality of macro-blocks as divisions of one picture frame.

14. The method of variable bit rate coding video data according to claim 11, wherein:
in the quantization step size setting step of setting the reference quantization step size for each first image unit, a first image unit complexity is computed, which is defined by the product of the average quantization step size and generated code bit rate over the preceding coded image, and also the reference quantization step size for each first image unit is computed from the ratio between the first image unit complexity and the average bit rate.

15. The method of variable bit rate coding video data according to claim 11, wherein:

in the quantization step size adjusting step of adjusting the quantization step size for each second image unit, a minimum permissible quantization step size is set.

16. The method of variable bit state coding video data according to claim 11, wherein:

in the quantization step size adjusting step of adjusting the quantization step size for each second image unit, a maximum excess of the average bit rate is set, a virtual buffer sized to the maximum excess is set for withdrawing codes at the average code bit, and the quantization step size is adjusted for each second image unit by using the occupation content in the virtual buffer and a utilizable code bit count obtained by subtracting the occupation content in the virtual buffer from the size thereof.

17. The method of variable bit rate video coding according to claim 11, wherein:

the quantization step size adjusting step of adjusting the quantization step size for each second image unit includes a step of computing a first quantization step size by adjusting the quantization step size for each second image unit from the generated code bit count provided from the video coding step and the bit balance of the generated bit count with respect to the average bit rate; and in the computing step, a maximum bit rate is set, a second quantization step size is computed, which is set in the case of fixed bit rate control on the basis of the maximum bit rate, from the quantization step size set in the quantization step size setting step and the generated code bit count provided from the video coding step, and the greater one of the first and second quantization step sizes is provided to the video coding step.

18. The method of variable bit rate coding video according to claim 11, wherein:

in the quantization step size setting means for setting the reference quantization step size for each first image unit, a first image unit complexity is computed for each first image unit, the first image unit being defined by the product of the summation of generated code bit rate and the average quantization step size for each first image unit, and the quantization step size of the first image is determined from the first image unit complexity of the first image unit and the bit rate per first image unit.

19. The method of variable bit rate coding video according to claim 11, wherein:

in the quantization step size setting means for setting the reference quantization step size for each first image unit, the first image unit complexity is computed for each first image unit from the summation of the generated code bit count and the average quantization step size for each first image unit, and the quantization step size of the first image unit is determined from the average first image unit complexity for the first image unit over the preceding coded image, the first image unit complexity of the immediately preceding first image unit or an average of a plurality of the first image unit complexity including the immediately preceding first image unit and the bit rate per first image unit.

20. The method of variable bit rate video coding according to claim 11, wherein:

in the quantization step size adjusting means of adjusting the quantization step size for each second image unit, a threshold quantization step size is preliminarily set, when the bit balance of the generated bit count with respect to the average bit rate is not excessive, the reference quantization step size set for each first image unit is compared with the threshold quantization step size, for providing the quantization step size without any adjustment when the reference quantization step size is not exceeding the bit balance to the average bit rate, and adjusting the quantization step size according to the bit balance of the generated bit count with respect to average bit rate and selectively providing the greater one of the adjusted quantization step size and the threshold quantization step size, and when the bit balance of the generated bit count with respect to the average bit rate is excessive, the quantization step size is adjusted according to the bit balance to the average bit rate, the adjusted quantizing with being provided as the quantizing with for each second image unit.

* * * * *